(12) United States Patent
Louzoun et al.

(10) Patent No.: US 9,774,536 B2
(45) Date of Patent: Sep. 26, 2017

(54) LINK STATUS BUFFER FLOW CONTROL MANAGEMENT

(75) Inventors: Eliel Louzoun, Jerusalem (IL); Liron Elmaleh, Kiryat Malachi (IL); Aviad Wertheimer, Tsur Hadassah (IL)

(73) Assignee: INTEL CORPORATION, Santa Clara, CA (US)

( * ) Notice: Subject to any disclaimer, the term of this patent is extended or adjusted under 35 U.S.C. 154(b) by 154 days.

(21) Appl. No.: 13/994,159

(22) PCT Filed: Nov. 15, 2011

(86) PCT No.: PCT/US2011/060693
§ 371 (c)(1),
(2), (4) Date: Jun. 24, 2014

(87) PCT Pub. No.: WO2013/074081
PCT Pub. Date: May 23, 2013

(65) Prior Publication Data
US 2014/0301198 A1    Oct. 9, 2014

(51) Int. Cl.
*H04L 12/26* (2006.01)
*G06F 13/36* (2006.01)
(Continued)

(52) U.S. Cl.
CPC ............ *H04L 47/125* (2013.01); *H04L 12/12* (2013.01); *H04L 47/13* (2013.01); *H04L 47/266* (2013.01);
(Continued)

(58) Field of Classification Search
CPC ..... H04L 47/125; H04L 47/13; H04L 47/266; H04L 12/12; H04L 47/29
See application file for complete search history.

(56) References Cited

U.S. PATENT DOCUMENTS 5,958,032 A * 9/1999 Manabe ................. 710/310
7,190,667 B2   3/2007 Susnow et al.
(Continued)

FOREIGN PATENT DOCUMENTS

CN    1808990        7/2006
CN    101253729 A    8/2008

OTHER PUBLICATIONS

International Preliminary Report on Patentability and Written Opinion received for PCT Patent Application No. PCT/US2011/060693, mailed on May 30, 2014, 5 pages.
(Continued)

*Primary Examiner* — Kiet Tang
(74) *Attorney, Agent, or Firm* — Grossman, Tucker, Perreault & Pfleger, PLLC

(57) ABSTRACT

Generally, this disclosure describes techniques for buffer management based on link status. A host platform may include a Baseboard Management Controller (BMC) and a network controller that includes a buffer used by the BMC. When a network controller is in a lower power link state, the BMC may attempt to send data to the link partner which causes the network controller to transition out of the low power state. However, this transition may take longer than the buffer's ability to buffer the incoming flow from the BMC. Accordingly, to avoid the need for larger buffer space, a buffer manager is used to provide flow control management of the buffer based on link status.

18 Claims, 3 Drawing Sheets

(51) Int. Cl.
*H03M 13/00* (2006.01)
*H04L 12/803* (2013.01)
*H04L 12/12* (2006.01)
*H04L 12/825* (2013.01)
*H04L 12/801* (2013.01)

(52) U.S. Cl.
CPC .............. *H04L 47/29* (2013.01); *Y02B 60/31* (2013.01); *Y02B 60/34* (2013.01); *Y02B 60/35* (2013.01)

(56) References Cited

U.S. PATENT DOCUMENTS

| | | | |
|---|---|---|---|
| 2004/0003148 A1 | 1/2004 | Ali-santosa et al. | |
| 2006/0126512 A1* | 6/2006 | Jain et al. | 370/236 |
| 2007/0081454 A1 | 4/2007 | Bergamasco et al. | |
| 2009/0129269 A1* | 5/2009 | Simmons et al. | 370/232 |
| 2010/0157803 A1* | 6/2010 | Rivers | H04L 47/10 370/235 |
| 2010/0293441 A1* | 11/2010 | Booth | 714/776 |
| 2010/0302957 A1 | 12/2010 | Ketheesan et al. | |
| 2010/0329108 A1* | 12/2010 | Diab | H04L 12/413 370/216 |

OTHER PUBLICATIONS

International Search Report and Written Opinion received for PCT Application No. PCT/US2011/060693, mailed on Aug. 30, 2012, 8 Pages.
China Office Action from related application CN201180074835.6 dated Dec. 7, 2015.
China Office Action from related application CN201180074835.6 dated Jul. 26, 2016.
Chinese Office Action issued in Chinese Application No. 201180074835.6, dated Jan. 12, 2017, with English translation, 16 pages.
Chinese Office Action issued in Chinese Application No. 201180074835.6, dated Jun. 26, 2017, with English machine translation, 16 pages.

* cited by examiner

LINK STATUS BUFFER FLOW CONTROL MANAGEMENT

FIELD

This disclosure relates to buffer flow control management, and, more particularly, to buffer flow control management based on link status.

BACKGROUND

IEEE Std 802.3Az™—2010, the "Energy-Efficient Ethernet" standard, includes techniques configured to conserve energy in networked devices. Among other things, the standard provides for transitioning a network controller's transmitter to a tower power state ("low power idle state") during periods of no or low activity. Intelligent platform management provides for monitoring of platform hardware and signaling platform health to a remote system, e.g., system administrator, using side-band and/or out-of-band communication. A baseboard management controller (BMC) is configured to monitor platform health and provide health-related information to the platform's network controller for buffering and transmission to the remote system.

When a network controller's transmitter is in the tow power state and there are packets to transmit, the network controller may be prompted to transition from the idle state to the active state. This transition time may be relatively lengthy. If the BMC sends packets to the network controller while the network controller is in a low power state, the network controller may need to buffer several packets while waiting for its transmitter to transition from idle to active. This may result in a relatively large buffer being allocated which may be relatively expensive. Similarly, if a link coupling two networked devices is in flow control, so that the link speed is significantly reduced, a relatively large number of packets may likewise need to be buffered.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure describes techniques for buffer management based on link status. A host platform may include a Baseboard Management Controller (BMC) and a network controller (e.g., network interface card (NIC)) that includes a buffer used by the BMC. When a network controller is in a lower power link state (such as, for example, a low power idle link state defined under the IEEE 802.3az standard), the BMC may attempt to send data to the link partner which causes the network controller to transition out of the low power state. However, this transition may take longer than the buffer's ability to buffer the incoming flow from the BMC. Accordingly, to avoid the need for larger buffer space, a buffer manager is used to provide flow control management of the buffer based on link status. For example, when in a lower power link state, the buffer manager may enable additional flow control mechanisms for the BMC buffer, so that when the BMC begins a packet flow to the network controller, the BMC is notified by the buffer manager to stop or significantly slow the packet flow. After the network controller has transitioned out of the low power link state, the buffer manager may notify the BMC to resume packet flow into the buffer.

Figure 1:
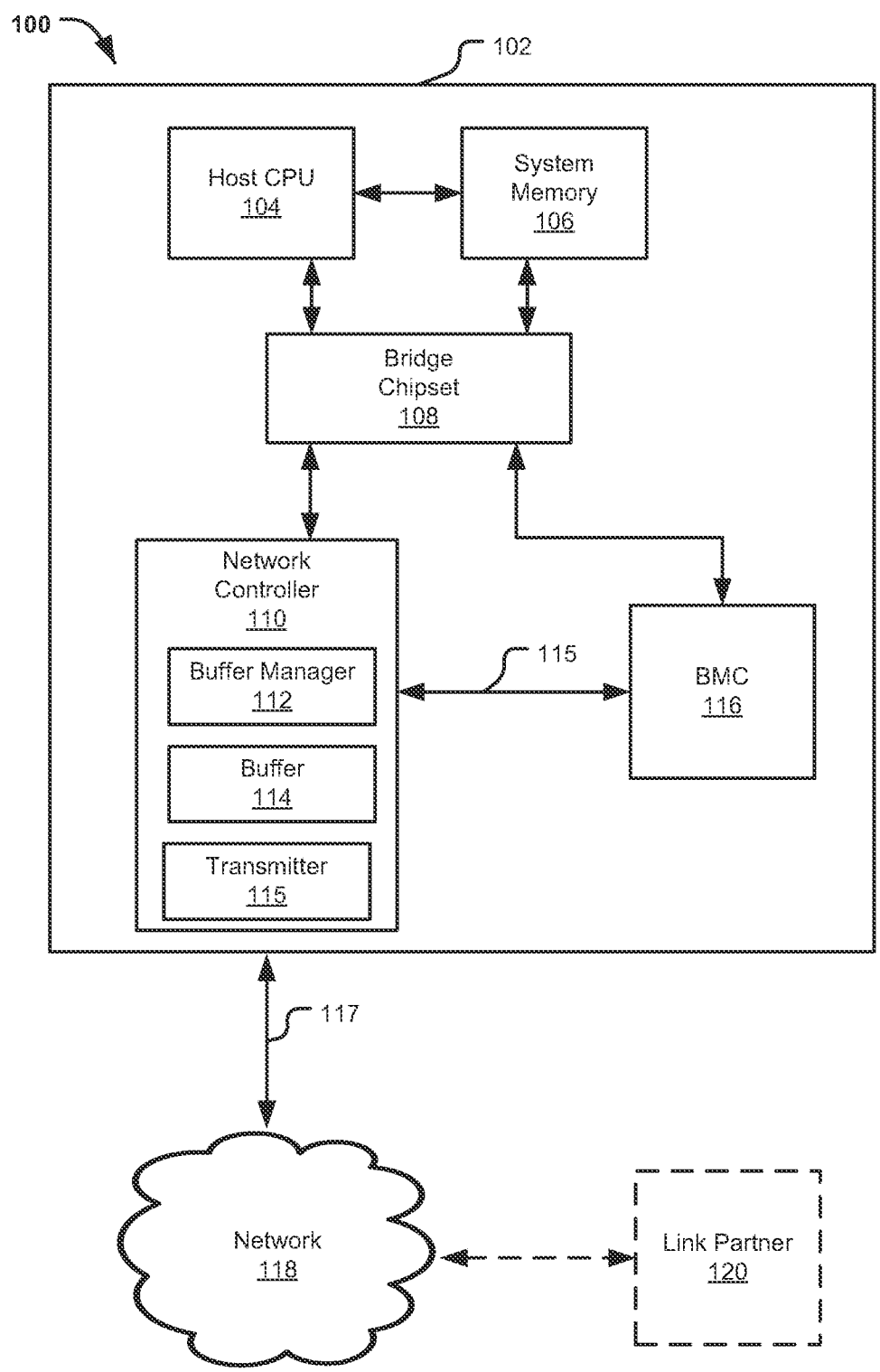
FIG. 1 illustrates a network system consistent with various embodiments of the present disclosure.

FIG. 1 illustrates a system 100 consistent with various embodiments of the present disclosure. The system 100 generally includes a host computer system 102 configured to communicate with at least one link partner 120 via a network 118. The host system 102 generally includes a host processor (host CPU) 104, a system memory 106, a bridge chipset 108, a network controller 110 and a baseboard management controller (BMC) 116. The host CPU 104 is coupled to the system memory 106 and the bridge chipset 108. The bridge chipset 108 is coupled to the system memory 106, the network controller 110 and the BMC 116. The network controller 110 is configured to couple the host system 102 to the network 118 via network link 117 and ultimately a link partner 120. The network controller 110 includes a buffer manager 112, a buffer 114 and a transmitter 115. The buffer 114 is configured to receive and store control and/or data from the BMC 116 for transmission via transmitter 115 and network link 117 to network 118 and link partner 120. The BMC 116 may be coupled to the network controller 110 by a system management bus 115. Coupling the network controller 110 and BMC 116 is configured to facilitate sideband and/or out-of-band communication between the BMC 116 and a remote device, e.g., link partner 120 via network link 117.

The BMC 116 may implement a platform management interface architecture such as, for example, the Intelligent Platform Management Interface (IPMI) architecture, defined under the Intelligent Platform Management Interface Specification v2.0, published Feb. 14, 2004 by Intel, Hewlett-Packard, NEC and Dell, and/or later versions of this specification. "Platform management" refers to monitoring and control functions that may be built into platform (e.g., host system 102) hardware and are primarily used for monitoring health of the host system hardware. For example, monitoring may include monitoring system temperatures, voltages, fans, power supplies, bus errors, system physical security, etc. Platform management may further include recovery capabilities such as local or remote system resets and power on/off operations, logging abnormal or "out-of-range" conditions, alerting (typically without the help of run-time software applications) and/or inventory information that may be used to identify a failed hardware unit.

The baseboard management controller, e.g., BMC 116, is configured to provide the intelligence in intelligent platform management. The BMC 116 is configured to manage the interface between system management software and platform management hardware, provide autonomous monitoring, event logging and recovery control. The BMC 116 is further configured to communicate to a remote device, e.g., link partner 120, via the network controller 110, network link 117 and network 118. Such communication between the BMC 116 and the network controller 110 may be out-of-band via system management bus 115.

The network controller 110, network link 117 and/or link partner 120 may be configured to provide "Energy-Efficient Ethernet" capability as defined in IEEE standard IEEE Std 802.3Az™—2010 (hereinafter "EEE"), titled "IEEE Standard for Information Technology-Telecommunications and information exchange between systems-Local and metropolitan area networks-Specific requirements Part 3: Carrier Sense Multiple Access with Collision Detection (CSMA/CD) Access Method and Physical Layer Specifications, Amendment 5: Media Access Control Parameters, Physical Layers, and Management Parameters for Energy-Efficient Ethernet", published October, 2010, by the Institute of Electrical and Electronic Engineers, and compatible and/or later versions of this standard.

EEE is configured to allow reduced power consumption during periods of lower data activity. Physical layer transmitters (e.g., transmitter 115) may be configured to go into a lower power ("low power idle") mode when no data is being sent. For example, these transmitters may be included in network controller 110 and/or link partner 120. The low power idle (LPI) mode may be entered in response to an LPI signal between the network controller 110 and link partner 120. When there is data to transmit, a normal idle signal may be sent to "wake up" the transmitter system. There may be a delay between the time the normal idle signal is sent and the time that the transmitter system becomes fully operational (i.e., capable of transmitting packets). A network link in an idle state corresponds to at least one of the network controller and the link partner being in the low power idle state.

Figure 2:
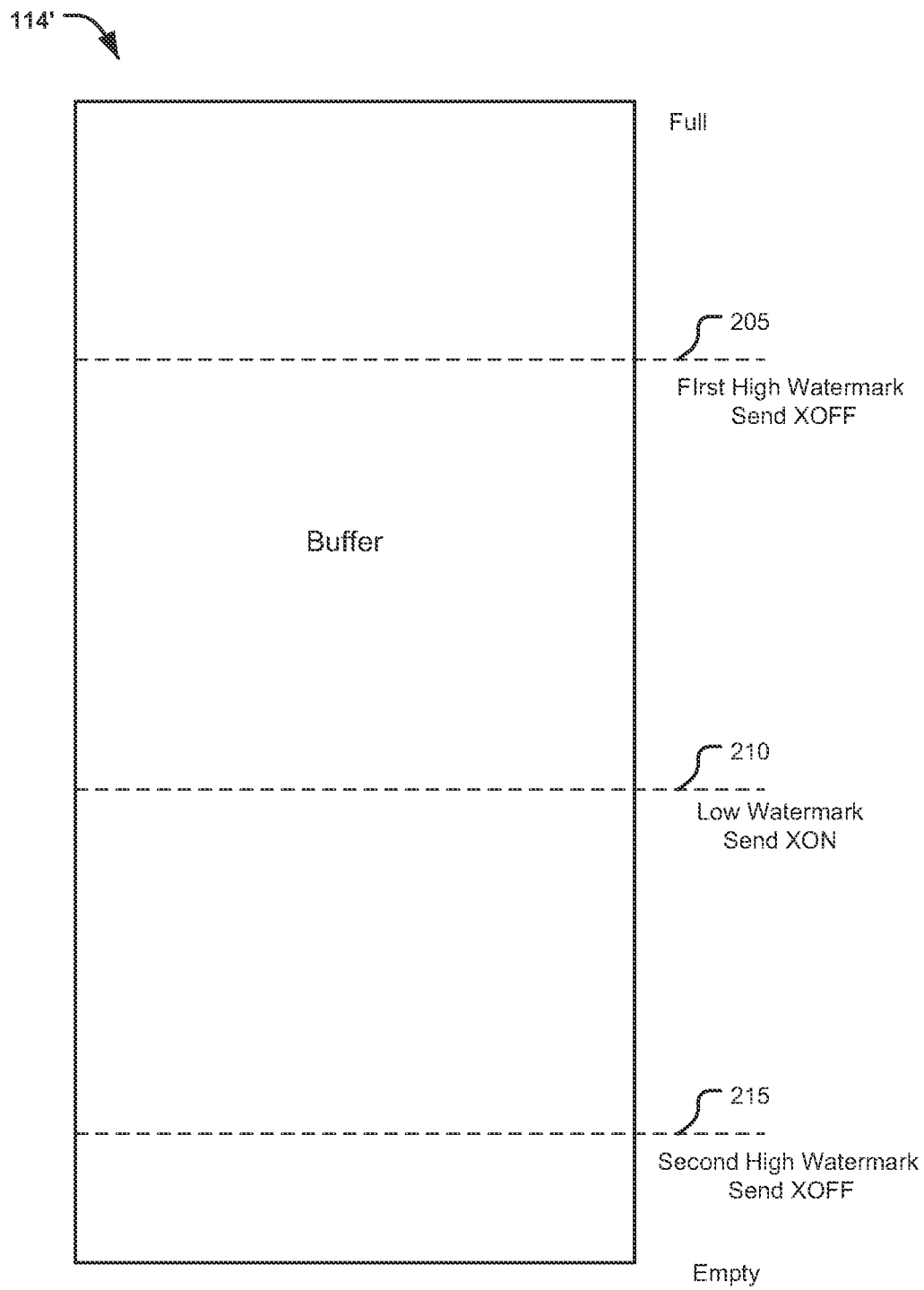
FIG. 2 is a diagram illustrating a buffer consistent with the present disclosure.

FIG. 2 is a diagram illustrating a buffer consistent with the present disclosure. The buffer 114' of FIG. 2 corresponds to the buffer 114 of FIG. 1. Buffer 114' is configured to receive and store information and data (e.g., packets) from BMC 116 that are to be transmitted over network link 117 by network controller 110. Buffer manager 112 is configured to perform flow control to ensure that buffer 114' does not overflow. A first high watermark 205 and a low watermark 210 may be defined for buffer 114'. If the number of packets stored in buffer 114' rises so that the buffer fill level exceeds the first high watermark 205, the buffer manager 112 may send the BMC 116 a command (e.g., an XOFF command) configured to cause the BMC 116 to stop sending packets to the network controller 110. As packets are sent from the network controller 110 (e.g., over network 118 via network link 117), the number of packets stored in buffer 114' may decrease so that buffer fill level decreases to less than the low watermark 210. The buffer manager 112 may then send the BMC 116 another command (e.g., an XON command) to again enable the BMC 116 to send data to the network controller 110.

In another embodiment, the buffer manager 112 may be configured to send a credit command to the BMC 116 configured to cause the BMC 116 to stop or start sending packets. The credit command may include an indication of available capacity of the buffer 114', host 102 and/or network 118 to accommodate packets transferred from the BMC 116 (e.g., amount of data that may be sent from BMC 116). For example, the credit command may be sent by the buffer manager 112 in response to receiving a packet from the BMC 116. In another example, the credit command may be sent at an interval.

The buffer 114' may be allocated based on predicted transmission needs of the BMC 116 as well as speed and bandwidth considerations associated with network controller 110, network link 117, network 118 and link partner 120. Since buffer capacity affects the physical size of a buffer and the physical size of the buffer can impact the complexity and die area of in integrated circuit, it may be more cost-effective to retain smaller buffers.

In typical flow control, if BMC 116 sends a packet to the network controller 110, the buffer manager 112 may send the BMC 116 an XOFF command when the buffer fill level crosses the first high watermark 205. If network link 117 is in low power idle mode (e.g., network controller 110 and/or link partner 120 are in low power idle mode), the buffer manager 112 may then trigger the network controller 110 to exit out of the low power idle state. During the transition from low power idle state to operational, if the BMC 116 continues to send packets, buffer 114' may overflow (e.g., because of the relatively limited headroom between the first high watermark and buffer full). In addition, while the network link 117 is in the low power idle state, packets are not being sent from buffer 114' so it may fill faster than when the network link 117 is not in the low power idle state and packets are being consumed. One possible solution is to increase the buffer size but increased buffer size may result in a cost penalty. It may therefore be desirable to avoid buffer overflow without increasing the buffer size. In an embodiment consistent with the present disclosure, the buffer manager 112 is configured to send the BMC 116 a command in response to receiving a packet, when the network link is in flow control (i.e., XOFF) or in a low power idle state. The command (e.g., an XOFF command) is configured to cause the BMC 116 to stop sending packets to the network controller 110. In this manner, the buffer manager 112 is configured to perform BMC flow control based on network link status.

Figure 3:
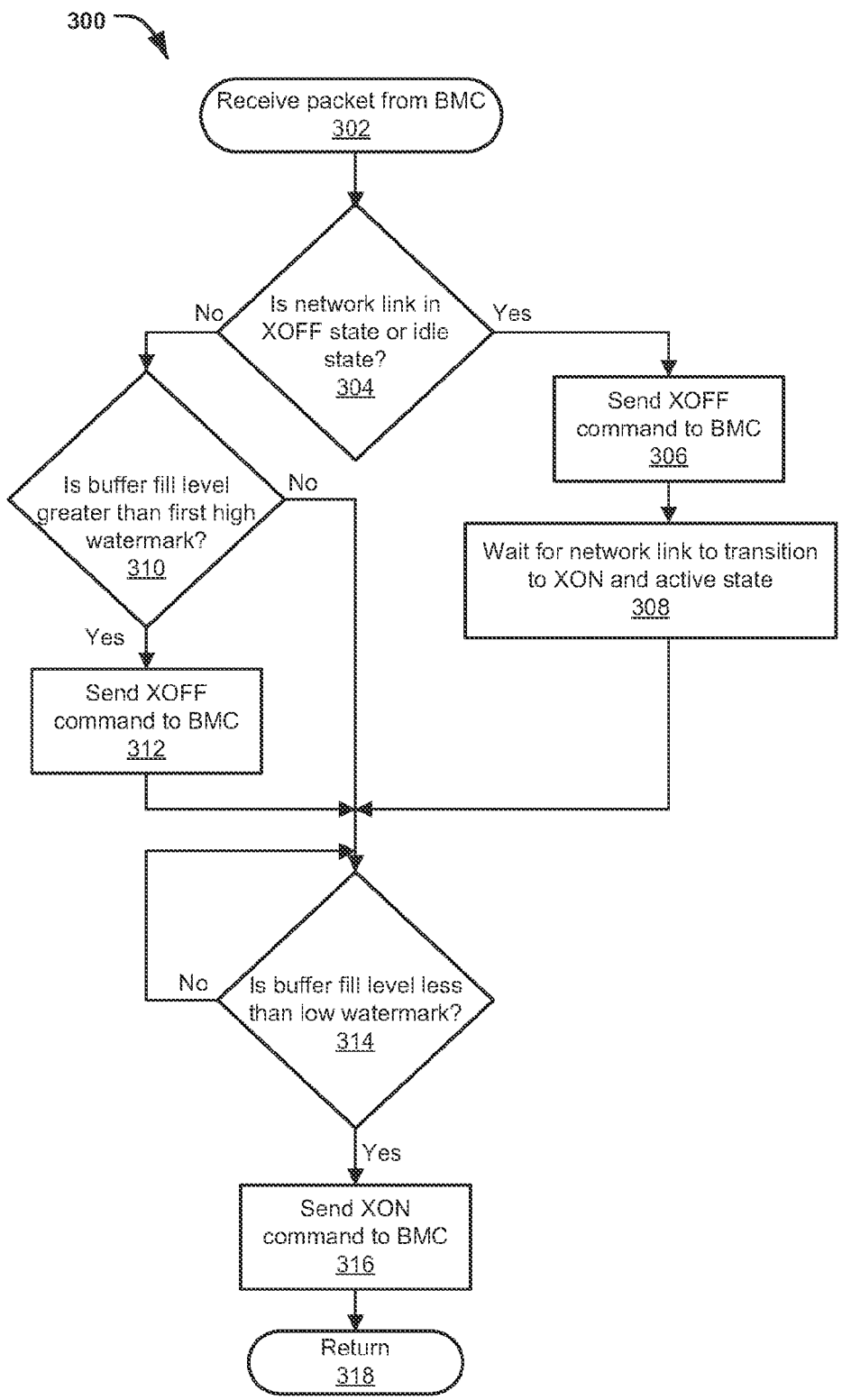
FIG. 3 illustrates a flowchart of exemplary operations consistent with one embodiment of the present disclosure.

FIG. 3 illustrates a flowchart 300 of exemplary operations consistent with one embodiment of the present disclosure. The operations may be performed, for example, by network controller 110 (and buffer manager 112). In particular, flowchart 300 depicts exemplary operations configured to send a command to the BMC 116 (configured to stop the BMC from sending additional packets) before the buffer fill level reaches the first high watermark 205 when the network link is in XOFF state or low power idle state. The flowchart 300 further depicts operations where a packet is received from the BMC and the network link is not in the XOFF state and not in the low power idle state.

The operations of flowchart 300 may be initiated 302 in response to receiving a packet from the BMC 116. Operations according to this embodiment may include determining whether the network link is in an XOFF (flow control) state or an idle (low power) state 304. The XOFF state corresponds to flow control for the network link. For example, if link partner 120 becomes busy, link partner 120 may signal network controller 110 to slow or stop transmission of packets to the link partner 120 until link partner 120 is able to receive packets again. The idle state corresponds to the low power idle state as described herein.

If the network link is in the XOFF state or in the idle state, an XOFF command may be sent to the BMC at operation 306. Operation 306 is configured to stop the BMC from sending further packets until the network link has exited the XOFF state or exited the idle state. Operation 308 may include waiting for the network link to transition to XON and active state from the XOFF state or low power idle state. Program flow may then proceed to operation 314.

In this manner, rather than allowing the buffer fill level to increase to the first high watermark 205, leaving little buffer space to accommodate packets sent by the BMC between the network controller sending the XOFF command and the BMC receiving the XOFF command, the buffer fill level when the XOFF command is sent may correspond to a watermark lower than the low watermark 210. For example, the buffer fill level may correspond to a second high watermark 215 (FIG. 2). Advantageously, sending the XOFF command when buffer fill level is at or near the second high watermark 215 may result in a relatively large portion of the buffer 114' being available to accommodate packets received from the BMC while the network link 117 is in the XOFF state or the idle state.

If the network link is not in the XOFF state and not in the idle state, whether the buffer fill level is greater than the first high watermark (e.g., first high watermark 205) may be determined at operation 310. If the buffer fill level is greater than the first high watermark, an XOFF command may be sent to the BMC at operation 312. Program flow may then proceed to operation 314. If the buffer fill level is not greater than the first high watermark, program flow may then proceed to operation 314.

Operation 314 may include determining whether the buffer fill level is less than the low watermark. If the buffer fill level is not less than the low watermark, operation 314 may be repeated. If the buffer fill level is less than the low watermark, an XON command may be sent to the BMC at operation 316 enabling the BMC to again send packets to the network controller. Program flow may end at operation 318.

While FIG. 3 illustrates various operations according one embodiment, it is to be understood that not all of the operations depicted in FIG. 3 are necessary for other embodiments. Indeed, it is fully contemplated herein that in other embodiments of the present disclosure, the operations depicted in FIG. 3 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a system CPU, network controller, and/or other programmable circuitry. Also, it is intended that operations described herein may be distributed across a plurality of physical devices, such as processing structures at more than one different physical location. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Network 118 may comprise a packet switched network. Network controller 110 may be capable of communicating with the link partner 120 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternative or additionally, network controller 110 may be capable of communicating with one or more devices, e.g., link partner 120, using an X.25 communications protocol. The X.25 communications protocol may comply or be compatible with a standard promulgated by the International Telecommunication Union-Telecommunication Standardization Sector (ITU-T). Alternatively or additionally, network controller 110 may be capable of communicating with one or more devices, e.g., link partner 120, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network controller 110 may be capable of communicating with one or more devices, e.g., link partner 120, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

"Circuitry", as used in any embodiment herein, may comprise, for example, singly or in any combination, hardwired circuitry, programmable circuitry, state machine circuitry, and/or firmware that stores instructions executed by programmable circuitry. A "manager", as used in any embodiment herein, may be embodied as circuitry. The circuitry may be embodied as an integrated circuit, such as an integrated circuit chip. It should be noted that the buffer 114 may be embodied as data structures stored in a storage medium, as defined above.

Thus, advantageously, the present disclosure provides a system and method for providing flow control for a baseboard management controller when a network link is in flow control itself (XOFF state) or is in a low power idle state, as described herein. Embodiments consistent with the disclosed method and system are configured to limit an allocated buffer fill level for storing packets from the BMC, awaiting transmission on the network link while accommodating increased storage when the network link is in the XOFF state or the low power idle state.

According to one aspect there is provided a network controller. The network controller may include a buffer configured to store a packet received from a baseboard management controller (BMC); and a buffer manager configured to send a first command to the BMC in response to receiving the packet from the BMC if a network link is in at least one of a flow control XOFF state or an idle state, wherein the first command is configured to stop the BMC from sending other packets.

According to another aspect there is provided a method. The method may include sending a first command to a baseboard management controller (BMC) in response to receiving a packet from the BMC if a network link is in at least one of a flow control XOFF state or an idle state, wherein the first command is configured to stop the BMC from sending other packets.

According to another aspect there is provided a host system. The host system may include a baseboard management controller (BMC); and a network controller. The network controller may include a buffer configured to store a packet received from the BMC, and a buffer manager configured to send a first command to the BMC in response to receiving the packet from the BMC if a network link is in at least one of a flow control XOFF state or an idle state, wherein the first command is configured to stop the BMC from sending other packets.

According to another aspect there is provided a system. The system may include one or more storage mediums having stored thereon, individually or in combination, instructions that when executed by one or more processors result in the following operations comprising:

sending an XOFF command to a baseboard management controller (BMC) in response to receiving a packet from the BMC if a network link is in at least one of a flow control transmit off state or an idle state, wherein the XOFF command is configured to stop the BMC from sending other packets.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A network controller communicably coupled between Baseboard Management Controller (BMC) circuitry and one or more networks external to the network controller, the network controller comprising:
   a transmitter coupled between the BMC circuitry and the one or more networks, the transmitter to transmit packets received from the BMC circuitry to at least one of the one or more networks, the transmitter having a low power idle state;
   a buffer to store the packets received from the BMC circuitry prior to transmission by the transmitter to the one or more networks, the buffer including a first high watermark and a low watermark; and
   buffer manager circuitry to send a first command to the BMC circuitry in response to receiving one or more packets from the BMC circuitry when the transmitter is in the low power idle state, the first command to reduce a transmission rate of packets from the BMC circuitry to the buffer.

2. The network controller of claim 1, the buffer manager circuitry to further send a second command to the BMC circuitry when the transmitter is not in the low power idle state, and a buffer fill level is less than the low watermark, the second command to increase the transmission rate of packets from the BMC circuitry to the buffer.

3. The network controller of claim 2, the buffer manager circuitry to further send the first command to the BMC circuitry when the buffer fill level is greater than a first high watermark, the first high watermark indicative of a relatively greater buffer fill level than the low watermark.

4. The network controller of claim 1 wherein the BMC circuitry is configured to monitor a status of a host system hardware.

5. The network controller of claim 1 wherein the transmitter low power idle state corresponds to a low power idle state defined by IEEE standard IEEE Std 802.3Az™—2010 and compatible or later versions of this standard.

6. A method, comprising:
   sending, by buffer management circuitry, a first command to baseboard management controller (BMC) circuitry in response to receiving, at a buffer, one or more packets from the BMC circuitry when a transmitter coupled between the buffer and one or more networks is in a low power idle state, the BMC circuitry to monitor a status of a host system hardware, the first command to reduce a transmission rate of packets from the BMC circuitry to the buffer, and the one or more networks disposed external to a network controller that includes the BMC circuitry, the buffer, and the transmitter.

7. The method of claim 6, further comprising:
   sending, by the buffer management circuitry, a second command to the BMC circuitry when the transmitter is not in the low power idle state, and a buffer fill level is less than a low watermark, the second command to increase the transmission rate of packets from the BMC circuitry to the buffer.

8. The method of claim 7, further comprising:
   sending, by the buffer management circuitry, the first command to the BMC circuitry when the buffer fill level is greater than a first high watermark, the first high watermark indicative of a relatively greater buffer fill level than the low watermark.

9. The method of claim 6 wherein the transmitter low power idle state corresponds to a low power idle state defined by IEEE standard IEEE Std 802.3Az™—2010 and compatible or later versions of this standard.

10. A host system comprising:
    baseboard management controller (BMC) circuitry; and
    network controller circuitry communicably coupled between the BMC circuitry and one or more networks external to the host system, the network controller circuitry including:
    a transmitter coupled between the BMC circuitry and the one or more networks, the transmitter to transmit packets received from the BMC circuitry to at least one of the one or more networks, the transmitter having a low power idle state;
    a buffer to store the packets received from the BMC circuitry prior to transmission by the transmitter to the one or more networks, the buffer including a first high watermark and a low watermark; and
    buffer manager circuitry to send a first command to the BMC circuitry in response to receiving one or more packets from the BMC circuitry when the transmitter is in the low power idle state, the first command to reduce a transmission rate of packets from the BMC circuitry to the buffer.

11. The host system of claim 10, the buffer manager circuitry to further send a second command to the BMC circuitry when the transmitter is not in the low power idle state, and a buffer fill level is less than the low watermark, the second command to increase the transmission rate of packets from the BMC circuitry to the buffer.

12. The host system of claim 11, the buffer manager circuitry to further send the first command to the BMC circuitry when the buffer fill level is greater than the first high watermark, the first high watermark indicative of a relatively greater buffer fill level than the low watermark.

13. The host system of claim 10, the BMC circuitry to monitor a status of a host system hardware.

14. The host system of claim 10 wherein the transmitter low power idle state corresponds to a low power idle state defined by IEEE standard IEEE Std 802.3Az™—2010 and compatible or later versions of this standard.

15. A system comprising, one or more non-transitory storage mediums having stored thereon, individually or in combination, instructions that when executed by one or more processors result in the following operations comprising:

sending, by buffer management circuitry, a first command to baseboard management controller (BMC) circuitry in response to receiving, at a buffer, one or more packets from the BMC circuitry when a transmitter coupled between the buffer and one or more networks is in a low power idle state, the BMC circuitry to monitor a status of a host system hardware, the first command to reduce a transmission rate of packets from the BMC circuitry to the buffer, and the one or more networks disposed external to a network controller that includes the BMC circuitry, the buffer, and the transmitter.

16. The system of claim 15, wherein the instructions that when executed by one or more processors results in the following additional operations:

sending, by buffer management circuitry, a second command to the BMC circuitry when the transmitter is not in the low power idle state, and a buffer fill level is less than a low watermark, the second command to increase the transmission rate of packets from the BMC circuitry to the buffer.

17. The system of claim 16, wherein the instructions that when executed by one or more processors results in the following additional operations:

Sending, by the buffer management circuitry, the first command to the BMC circuitry when the buffer fill level is greater than a first high watermark, the first high watermark indicative of a relatively greater buffer fill level than the low watermark.

18. The system of claim 15 wherein the transmitter low power idle state corresponds to a low power idle state defined by IEEE standard IEEE Std 802.3Az™—2010 and compatible or later versions of this standard.

* * * * *